US011163592B2

United States Patent
Silva et al.

(10) Patent No.: US 11,163,592 B2
(45) Date of Patent: Nov. 2, 2021

(54) GENERATION OF BENCHMARKS OF APPLICATIONS BASED ON PERFORMANCE TRACES

(71) Applicant: INTERNATIONAL BUSINESS MACHINES CORPORATION, Armonk, NY (US)

(72) Inventors: Bruno Silva, São Paulo (BR); Renato Luiz de Freitas Cunha, São Paulo (BR); Nelson Mimura Gonzalez, São Paulo (BR); Marco Aurelio Stelmar Netto, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/740,369

(22) Filed: Jan. 10, 2020

(65) Prior Publication Data

US 2021/0216338 A1 Jul. 15, 2021

(51) Int. Cl.
*G06F 9/44* (2018.01)
*G06F 9/455* (2018.01)
(Continued)

(52) U.S. Cl.
CPC .......... *G06F 9/455* (2013.01); *G06F 11/3414* (2013.01); *G06N 7/005* (2013.01)

(58) Field of Classification Search
None
See application file for complete search history.

(56) References Cited

U.S. PATENT DOCUMENTS 5,930,497 A 9/1999 Cherian et al.
6,145,121 A 11/2000 Levy et al.
(Continued)

FOREIGN PATENT DOCUMENTS

CN 105302531 A 2/2016
CN 104090748 B 6/2017
(Continued)

OTHER PUBLICATIONS

List of IBM Patents and or Applications Treated as Related, 2 pgs.
(Continued)

*Primary Examiner* — Insun Kang
(74) *Attorney, Agent, or Firm* — Intelletek Law Group, PLLC; Gabriel Daniel, Esq.

(57) ABSTRACT

A benchmark generating system is presented. The system monitors an execution of a computer program to collect performance traces for one or more load metrics. The system generates a program model based on the collected performance traces. Each state of the program model corresponds to a workload level at one load metric or a combination of workload levels at the two or more load metrics. The system also generates one or more workload models based on the collected performance traces. Each workload model is configured to generate simulated workload for one load metric of the one or more load metrics at a workload level that is determined based on a state of the program model. The system provides the generated program model and the generated workload models as a benchmark of the computer program.

12 Claims, 8 Drawing Sheets

(51) Int. Cl.
*G06N 7/00* (2006.01)
*G06F 11/34* (2006.01)

(56) References Cited

U.S. PATENT DOCUMENTS

| | | | |
|---|---|---|---|
| 6,587,833 B1 | 7/2003 | Ruffin et al. | |
| 6,651,243 B1 | 11/2003 | Berry et al. | |
| 7,174,536 B1 | 2/2007 | Kothari | |
| 7,444,499 B2 | 10/2008 | Davis | |
| 7,818,746 B2 | 10/2010 | Anderson | |
| 8,028,280 B2 | 9/2011 | Kumar | |
| 8,359,463 B2* | 1/2013 | Merchant | G06F 11/3616 713/100 |
| 8,566,803 B2 | 10/2013 | Branson et al. | |
| 8,719,771 B2 | 5/2014 | Ovadia | |
| 8,806,080 B1 | 8/2014 | Temple, III | |
| 9,983,871 B1* | 5/2018 | Edwards | H04L 67/34 |
| 10,241,902 B2 | 3/2019 | Duttagupta et al. | |
| 10,643,751 B1* | 5/2020 | Drouin | G06N 20/20 |
| 10,678,666 B1 | 6/2020 | Gauf | |
| 2005/0080639 A1 | 4/2005 | Tang | |
| 2007/0226698 A1 | 9/2007 | Cascaval et al. | |
| 2009/0083717 A1* | 3/2009 | Branson | G06F 11/3428 717/130 |
| 2009/0164861 A1* | 6/2009 | Tseng | G06F 11/263 714/739 |
| 2009/0216997 A1* | 8/2009 | Balasubramonian | G06F 9/5061 712/30 |
| 2010/0083248 A1* | 4/2010 | Wood | G06F 9/45558 718/1 |
| 2011/0225569 A1 | 9/2011 | Beaty et al. | |
| 2012/0137111 A1 | 5/2012 | Hayashizaki | |
| 2012/0197680 A1* | 8/2012 | Zircher, IV | G06Q 10/0631 705/7.25 |
| 2012/0284698 A1 | 11/2012 | Brunkhorst et al. | |
| 2013/0239098 A1 | 9/2013 | Makoto | |
| 2013/0332913 A1* | 12/2013 | Dickenson | G06F 11/3644 717/158 |
| 2014/0258688 A1 | 9/2014 | Breternitz et al. | |
| 2014/0350910 A1* | 11/2014 | Talwadker | G06F 30/20 703/21 |
| 2015/0039764 A1* | 2/2015 | Beloglazov | H04L 47/70 709/226 |
| 2016/0140025 A1* | 5/2016 | Enright | G06F 11/3684 717/128 |
| 2016/0188431 A1* | 6/2016 | Chahal | G06F 11/3428 702/182 |
| 2016/0239212 A1* | 8/2016 | Solihin | G06F 11/3037 |
| 2016/0259714 A1 | 9/2016 | Shor et al. | |
| 2016/0266920 A1* | 9/2016 | Atanasov | G06F 11/301 |
| 2016/0335379 A1* | 11/2016 | Harn | G06F 30/20 |
| 2017/0153963 A1* | 6/2017 | Chahal | G06F 11/3006 |
| 2017/0153966 A1 | 6/2017 | Cao et al. | |
| 2017/0178045 A1* | 6/2017 | Wasik | G06Q 10/06393 |
| 2018/0018617 A1* | 1/2018 | Banik | G06Q 10/063114 |
| 2018/0024911 A1 | 1/2018 | Kruszewski et al. | |
| 2018/0025289 A1* | 1/2018 | Doshi | G06F 9/50 706/12 |
| 2018/0121317 A1 | 5/2018 | Ekambaram et al. | |
| 2018/0137027 A1 | 5/2018 | Breitgand et al. | |
| 2018/0217913 A1* | 8/2018 | Chahal | G06F 11/3041 |
| 2018/0246802 A1* | 8/2018 | Cerny | G06F 9/3001 |
| 2018/0276325 A1* | 9/2018 | Polovick | G06Q 10/10 |
| 2019/0042391 A1* | 2/2019 | Menon | G06F 11/3428 |
| 2019/0114570 A1 | 4/2019 | Prasad | |
| 2019/0140910 A1* | 5/2019 | Ganapathi | G06F 16/2477 |
| 2019/0179738 A1* | 6/2019 | Hawthorne | G06F 30/20 |
| 2019/0197653 A1 | 6/2019 | Artico et al. | |
| 2019/0317880 A1* | 10/2019 | Herr | G06F 11/3409 |
| 2020/0042419 A1* | 2/2020 | Wei | G06F 11/3447 |
| 2020/0118039 A1* | 4/2020 | Kocberber | G06N 20/00 |
| 2020/0162352 A1* | 5/2020 | Jorgenson | G06F 11/302 |
| 2020/0218985 A1* | 7/2020 | Wei | G06N 3/0454 |
| 2020/0279187 A1* | 9/2020 | Huang | G06F 11/3452 |
| 2020/0320371 A1* | 10/2020 | Baker | G06N 3/063 |
| 2020/0379882 A1* | 12/2020 | Salunke | G06F 11/3608 |
| 2020/0394462 A1* | 12/2020 | Hild | G06N 20/00 |

FOREIGN PATENT DOCUMENTS

| | | |
|---|---|---|
| CN | 107678968 A | 2/2018 |
| CN | 104850411 B | 6/2018 |
| FR | 3025036 A1 | 6/2019 |
| JP | 5170555 B2 | 1/2013 |
| JP | 2016-100006 A | 5/2016 |

OTHER PUBLICATIONS

Franchetti, F. et al. "Automatic Generation of the HPC Challenge's Global/PFFT Benchmark for BlueGene/P" Carnegie Mellon University, ECE Department, Pittsburgh, PA 15213, USA (date unknown); 14 pgs.

Mell, P. et al., "Recommendations of the National Institute of Standards and Technology"; NIST Special Publication 800-145 (2011); 7 pgs.

Wu, X. et al., "ScalaBenchGen: Auto-Generation of Communication Benchmarks Traces"; (date unknown); 11 pgs.

* cited by examiner

GENERATION OF BENCHMARKS OF APPLICATIONS BASED ON PERFORMANCE TRACES

BACKGROUND

Technical Field

The present disclosure generally relates to software development tools, and more specifically, benchmark generation.

Description of the Related Arts

Capacity planning is a very expensive and time-consuming task. In general, when evaluating new platforms, a common approach is to create a set of benchmarks based on the resource consumption characteristics (or workload) of user applications. Benchmarks are designed to mimic a particular type of workload on a component or system. Synthetic benchmarks do this by specially created programs that impose the workload on the component. Application benchmarks run real-world programs on the system. While application benchmarks usually give a much better measure of real-world performance on a given system, synthetic benchmarks are useful for testing individual components such as hard disks or networking devices.

Creating such benchmarks typically involves highly specialized programmers and domain specialists. Such benchmarks tend to focus on the most resource demanding parts of the program. Usually, access to the original source code and/or input/output of the application is involved, and not all companies have the expertise to create such benchmarks. For example, a company A that owns the application may not have the expertise to create such benchmarks. This same company A may want to contract with another company B to develop this benchmark, but company A does not want to or cannot disclose source code and/or inputs/outputs.

SUMMARY

Some embodiments of the disclosure provide a benchmark generating system. The system monitors an execution of a computer program to collect performance traces for one or more load metrics. The system generates a program model based on the collected performance traces. Each state of the program model corresponds to a workload level at one load metric or a combination of workload levels at the two or more load metrics. The system also generates one or more workload models based on the collected performance traces. Each workload model is configured to generate simulated workload for one load metric of the one or more load metrics at a workload level that is determined based on a state of the program model. The system provides the generated program model and the generated workload models as a benchmark of the computer program.

In some embodiments, the program model includes a probabilistic or stochastic model state machine (e.g., a Continuous-Time Markov Chain, or CTMC). Each state of the program model corresponds to a clustered workload level at one load metric or a combination of clustered workload levels at two or more load metrics. Each clustered workload level of a load metric is aggregated from multiple samples of workload levels of the load metric. Each clustered workload level of a load metric may be identified based on local minima of a probability distribution of workload levels for the load metric.

By using performance traces and measurements to identify clusters of workload levels and CTMC states, the benchmark generating system is able to automatically generate a benchmark of a target program. The clustering of workload levels also prevents state explosion, thereby creating a more efficient benchmark. Preventing state explosion by limiting the number of states using clustering also enhances the feasibility of the system, since the system is able to generate benchmarks even for applications with high variability of resource consumption.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a benchmark generating system for automatically creating benchmarks, with or without access to the source code or input/output data. The system creates a benchmark of a computer program or application based on the performance measurements, traces, and/or load characteristics of the program. The benchmark of the program may include one or more workload models (also referred to as performance kernels) that emulate the resource consumption of the program using load metrics specified by the user. The benchmark of the program may also include a program model that describes the program's behavior, which in some embodiments is implemented as a stateful probabilistic/stochastic model, such as a Continuous-Time Markov Chain (CTMC) state machine. Specifically, each state of the CTMC state machine represents a combination of consumption levels of different resources being measured. Transition rates are associated with how often the application exhibits a particular combination of levels. The benchmark generation system also prevents state explosion by using kernel density estimation to identify clusters of load measurements or workload levels. Each cluster becomes a granularity level used to define the CTMC states. The resulting benchmark is a simulator that reflects the behavior of the original application, with the workload models used to generate simulated workload based on states generated by the program model.

Figure 1:
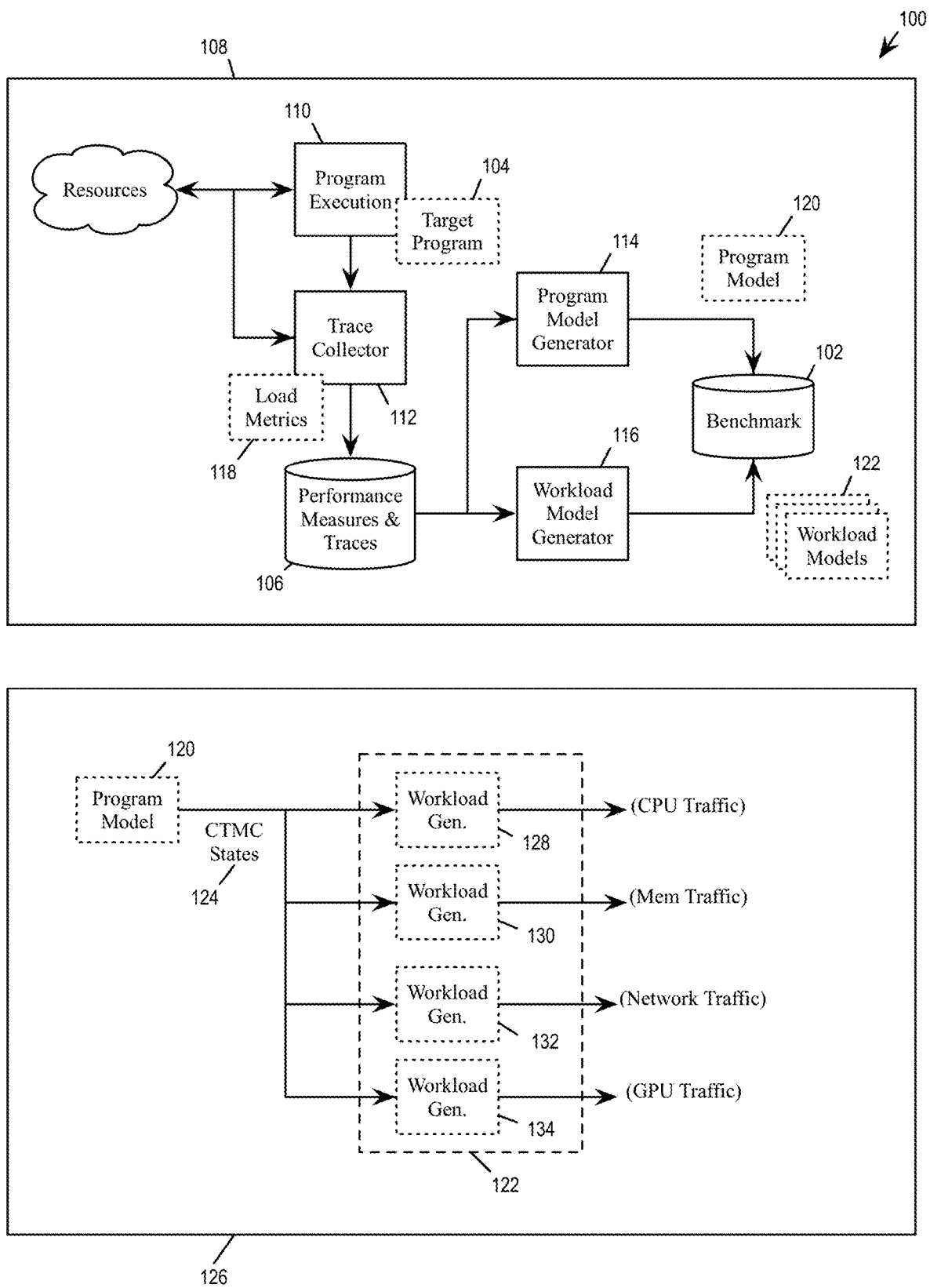
FIG. 1 conceptually illustrates a benchmark generating system, consistent with an exemplary embodiment.

FIG. 1 conceptually illustrates a benchmark generating system 100, consistent with an exemplary embodiment. The benchmark generating system 100 generates a benchmark 102 for a target program 104 based on the performance traces 106 of the program. As illustrated, a computing device 108 implements the benchmark generating system 100. The benchmark generating system 100 includes a program execution module 110, a trace collection module 112, a program model generation module 114, and a workload model generation module 116. In some embodiments, the modules 110-116 are modules of software instructions being executed by one or more processing units (e.g., a processor) of the computing device 108.

In some embodiments, the modules 110-116 are modules of hardware circuits implemented by one or more integrated circuits (ICs) of an electronic apparatus. Though the modules 110, 112, 114, and 116 are illustrated as being separate modules, some of the modules can be combined into a single module. For example, the functionalities of the program execution module 110 and the trace collection module 112 can be merged to form one program execution tracing module. An example computing device 600 that may implement the computing device 108 will be described by reference to FIG. 6 below.

The target program 104 is executed at the program execution module 110. The trace collection module 112 monitors the execution of the target program 104 and its corresponding resource consumption activities to collect the performance traces 106. The collection of performance measurements and/or traces is for one or more load metrics 118, which may be specified by the user of the system. The specified load metrics 118 may include metrics for various resource consumption, such as metrics for central processing unit (CPU), memory, network, graphic processing unit (GPU), storage/hard disk, etc.

Based on the collected performance traces 106, the program model generation module 114 generates a program model 120 and the workload model generation module 116 generates one or more workload models 122. The generated program model 120 may be a CTMC state machine (or another type of probabilistic or stochastic state machine). Each state of the state machine corresponds to a workload level or a combination of workload levels at the one or more load metrics 118. The generated workload models 122 includes various workload generators that generates simulated workload for the one or more load metrics 118. Specifically, a CPU workload generator 128 generates simulated CPU traffic (e.g., CPU instructions), a memory workload generator 130 generates simulated memory traffic (e.g., memory read and/or write operations), a GPU workload generator 132 generates simulated GPU traffic (e.g., GPU instructions), and a network workload generator 134 generates simulated network traffic (e.g., outgoing data packets).

The generated program model 120 and the generated workload models 122 are provided as parts of the benchmark 102, which may be delivered as a benchmark application or program to a party interested in evaluating the performance and load characteristics of the target program 104. At a verifying system 126 of such an interested party, the benchmark 102 is executed to evaluate the target program 104. The program models 120 outputs CTMC state 124 and the workload models 122 uses the generated CTMC state 124 as input to modulate the generation of the simulated workloads. The verifying system 126 may include the computing device 108, or be an entirely different computing system.

Figure 2:
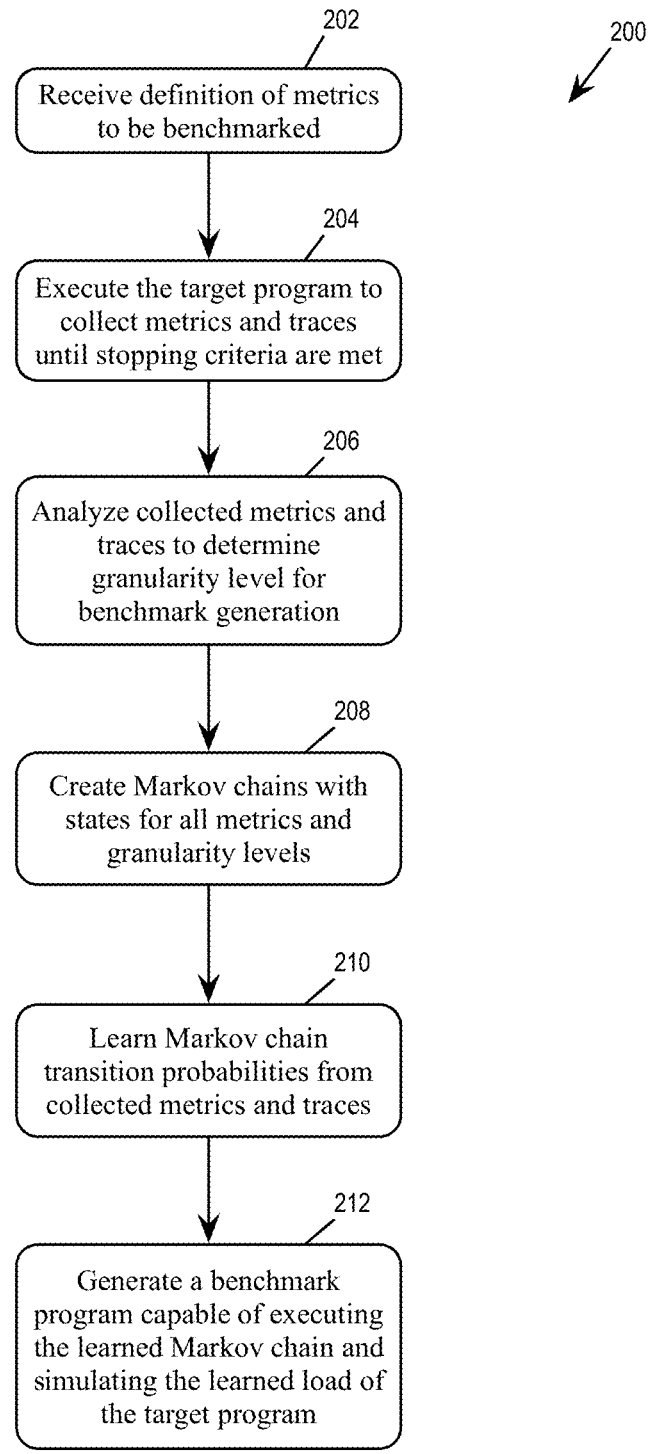
FIG. 2 conceptually illustrates a process for generating a benchmark for simulating the workload of a target program, consistent with an exemplary embodiment.

FIG. 2 conceptually illustrates a process 200 for generating a benchmark for simulating the workload of a target program, consistent with an exemplary embodiment. In some embodiments, one or more processing units (e.g., processor) of a computing device implementing the benchmark generating system 100 (e.g., the computing device 108) perform the process 200 by executing instructions stored in a computer readable medium.

The system receives (at block 202) a definition or specification of a set of metrics to be benchmarked. The user of the benchmark generating system 100 may define what metrics are important to generate the benchmark based on his/her application. Based on the set of metrics selected by the user, the system enables certain metric monitoring modules or performance kernels. In some embodiments, there is one kernel for each metric being benchmarked. In some embodiments, the number of performance kernels enabled is the number of metrics selected. The examples of metrics that are specified to be benchmarked may include various usage statistics of CPU, memory, GPU, network, and storage.

The system executes (at block 204) the target program to collect performance measurements and traces until stopping criteria are met. A data collection agent (e.g., the trace collector 112) records data for each of the metrics selected at block 202. The stopping criteria may stop the execution and collection operation when the target program stops (if the target program has a start and end), or when the user instructs the data collection agent to stop recording. In some embodiments, the data collection agent may stop data collection when sufficient amount of traces or measurements have been collected.

The system analyzes (at block 206) the collected performance measurements and traces to determine a granularity level for benchmark generation. Or, more generally, the system analyses the collected performance measurements and traces and determines how the data should be aggregated or clustered for creation of the states of the Markov chain for emulating the target in the generated benchmark.

The system creates (at block 208) Markov chains with states for all metrics and granularity levels. From the number of states and ranges of metric utilization generated in block 206, the system initializes a new Markov Chain with the number of states computed. To prevent state explosion, the system may create a hierarchical Markov chain with one Markov chain for each metric.

The system learns (at block 210) Markov chain transition probabilities from the collected performance measurements and traces. The system may use a Markov Chain learning algorithm such as the Viterbi algorithm or Monte Carlo Markov Chain to learn the transition probabilities between states of the Markov chain.

The system generates (at block 212) a benchmark program capable of executing the learned Markov chain and simulating the learned load of the target program. Once the system has learned the Markov Chain transition probabilities, the system combines the performance kernels (as the workload models) with a Continuous Time Markov Chain (CTMC) simulator (as the program model) that is able to generate behavior similar to the original application.

Figure 3:
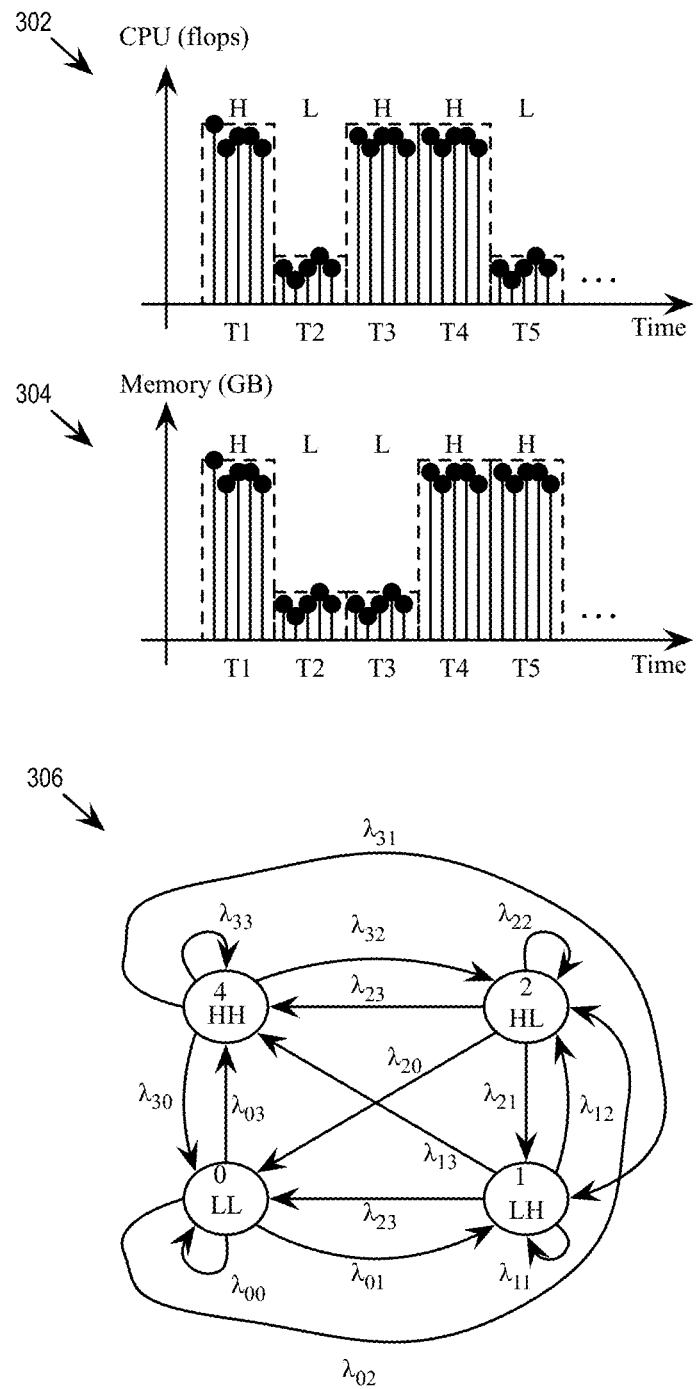
FIG. 3 conceptually illustrates generating a program model by deriving a CTMC state machine based on performance measurements or traces collected from execution of the target program.

FIG. 3 conceptually illustrates generating a program model by deriving a CTMC state machine based on performance measurements or traces collected from execution of the target program. As illustrated, the system received traces 302 and 304 that are indicative of the load imposed by the target program 104 over time. The trace 302 corresponds to the workload levels on CPU (which may be in flops) and the trace 304 corresponds to the workload levels on the memory (which may be in Gigabits).

As mentioned, the workload levels of each trace or load metric are clustered or aggregated for the purpose of identifying CTMC states. In some embodiments, workload levels within a time window that are sufficiently similar to each other, e.g., within a particular granularity level are identified as one cluster. In some embodiments, each state of the program model corresponds to a clustered workload level at one load metric or a combination of clustered workload levels at two or more load metrics. Each clustered workload level of a load metric is aggregated from multiple samples of workload levels of the load metric at finer granularity.

In the example of FIG. 3, for the trace of CPU load metric 302, workload levels within a timing window T1 are clustered together and considered to have a "H" or "high" workload level, while the workload levels within a timing window T2 are clustered together and considered to have a "L" or "low" workload level. The workload levels subsequent to timing window T2 (T3, T4, T5, etc.) are also clustered and classified as either "H" or "L." Likewise, for the trace of the memory load metric 304, workload levels within each timing window (e.g., T1, T2, T3, etc.,) are clustered together and classified as either "H" or "L." The clustering of workload levels is further described by reference to FIG. 4 below.

The CTMC state machine of the program model is in turn created by using the identified clusters of workload levels, with each state of the CTMC state machine representing a combination of workload levels at different load metrics. FIG. 3 illustrates an example CTMC state machine 306 for which the states are derived from the combinations of the clustered workload levels of load metrics for CPU and memory (based on traces 302 and 304). As illustrated, the CTMC state machine 306 has 4 states "1," "2," "3," and "4." State "1," or "LL," corresponds to when both CPU and memory are at low workload level clusters. State "2," or "LH," corresponds to when CPU is at a low workload level cluster and memory is at a high workload level cluster. State "3," or "HL," corresponds to when CPU is at a high workload level cluster and memory is at low workload level cluster. State "4," or "HH," corresponds to when both CPU and memory are at high workload level clusters.

The example CTMS state machine 330 also illustrates transition rates between the different states. Transition rates are associated with how often the target program transition from one state to another state, e.g., from a first combination of workload levels to a second combination of workload levels. The transition rate of each transition from a state i to a state j is labeled as $\lambda_{i,j}$. In some embodiments, the transition rates may be determined based on the collected performance measurements or traces such as 302 and 304.

Although the example of FIG. 3 illustrates a CTMC state machine that is constructed based on a combination of two load metrics, each load metric having only two identified clustered workload levels ("H" and "L"), in some embodiments, the CTMS state machine may be constructed based on combinations of three or more load metrics. In some embodiments, one of the load metrics may have more than two identified clustered workload levels. For example, the benchmark generating system may identify, for a load metric "A," two workload level clusters "A1" and "A2," but also identify, for a load metric "B," three workload level clusters "B1," "B2," and "B3." A CTMC state machine thusly constructed may include six states that corresponds to combinations {A1, B1}, {A1, B2}, {A1, B3}, {A2, B1}, {A2, B2}, and {A2, B3}.

Figure 4:
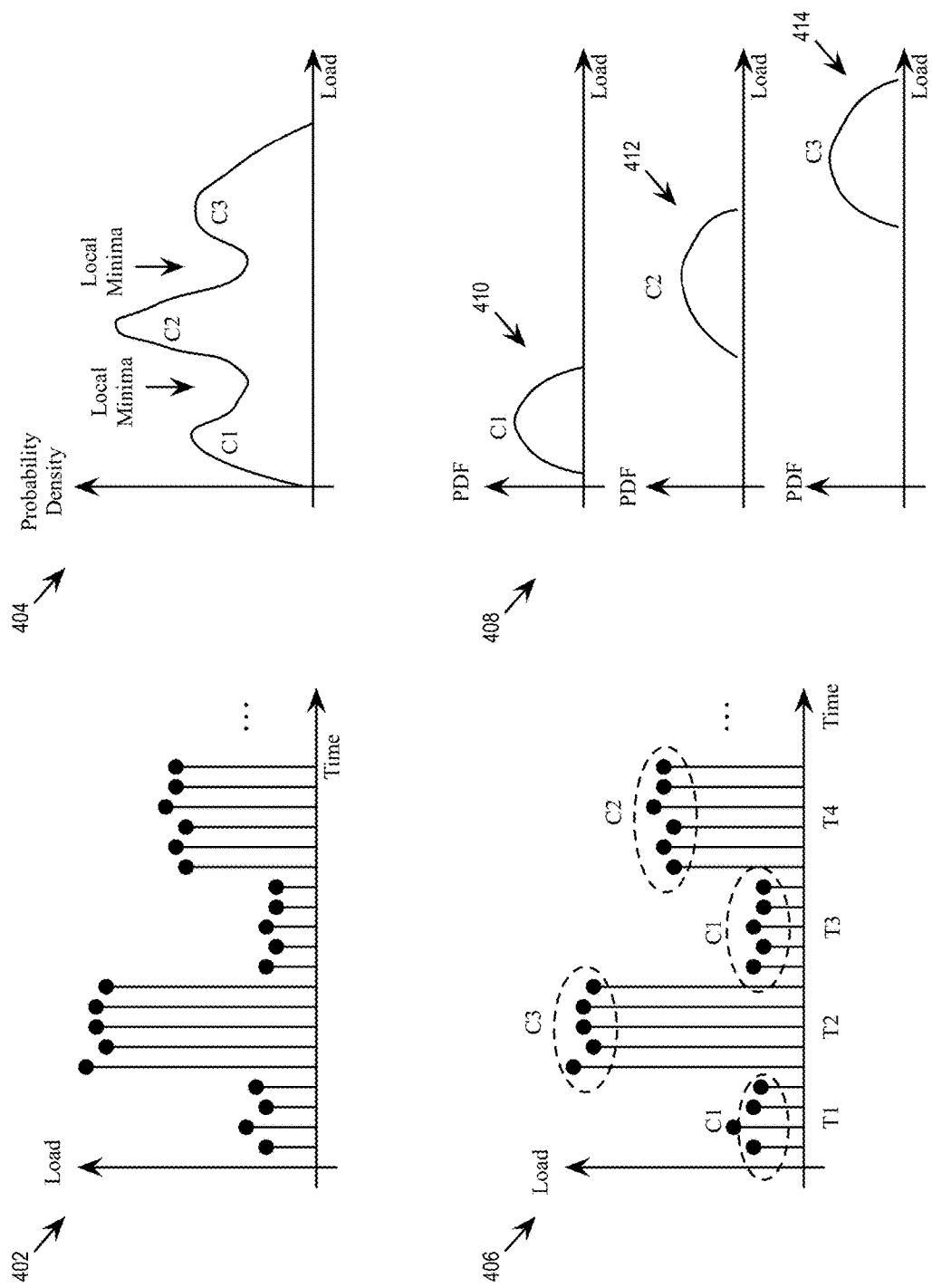
FIG. 4 conceptually illustrates the clustering or aggregating of performance traces or measurements of a particular load metric.

FIG. 4 conceptually illustrates the clustering or aggregating of performance traces or measurements of a particular load metric (e.g., CPU use). The clustering operation changes an initial, finger granularity level of the performance traces collection (e.g., millisecond) to a coarser granularity level for CTMC states (e.g., seconds). The granularity levels may be set by the user. The clustering of performance traces or measurements is shown in four charts 402, 404, 406, and 408.

The first chart 402 shows the performance trace or measurement collected for the particular load metric. Each sample of the performance trace corresponds to a workload level of the particular load metric at one instance in time (in millisecond intervals).

The second chart 404 shows a probability density function (PDF) of the particular load metric. The benchmark generating system applies kernel density estimation technique to derive the PDF. Kernel density estimation is a non-parametric method for estimating the probability density function of a random variable. The PDF 404 shows probability densities at different workload levels. The PDF is used to identify unique clusters of workload levels. For multimodal PDFs, the benchmark generating system may use the number of local minima to estimate the number of unique clusters in the clustering algorithms. Specifically, in some embodiments, the number of unique clusters is equal to the number of local minima in the PDF plus one. The PDF 404 shows two local minima, which corresponds to three unique clusters of workload levels labeled C1, C2, and C3 for the particular load metric. The benchmark generating system may identify the unique clusters by using an AI clustering algorithm. Each identified unique cluster of workload levels can be used to define CTMC states (in combination with identified clusters of other load metrics).

The third chart 406 shows the identified clusters of workload levels (C1, C2, and C3) that are annotated over the collected performance traces or measurements. As illustrated, the workload levels within a time interval T1 are collectively regarded as having cluster workload level C1; the workload levels within a time interval T2 are collectively regarded as having cluster workload level C3; the workload levels within a time interval T3 are collectively regarded as having cluster workload level C1; the workload levels within a time interval T4 are collectively regarded as having cluster workload level C2; etc.

The fourth chart 408 shows noise being injected into the simulated workload levels for clusters C1, C2, and C3. Specifically, a probability distribution function is fitted on the PDF of the particular load metric to determine the variations (e.g., to simulate noise) in workload levels for each of the clusters. The chart 408 shows distributions 410, 412, and 414 for clusters C1, C2, and C3, respectively.

Figure 5:
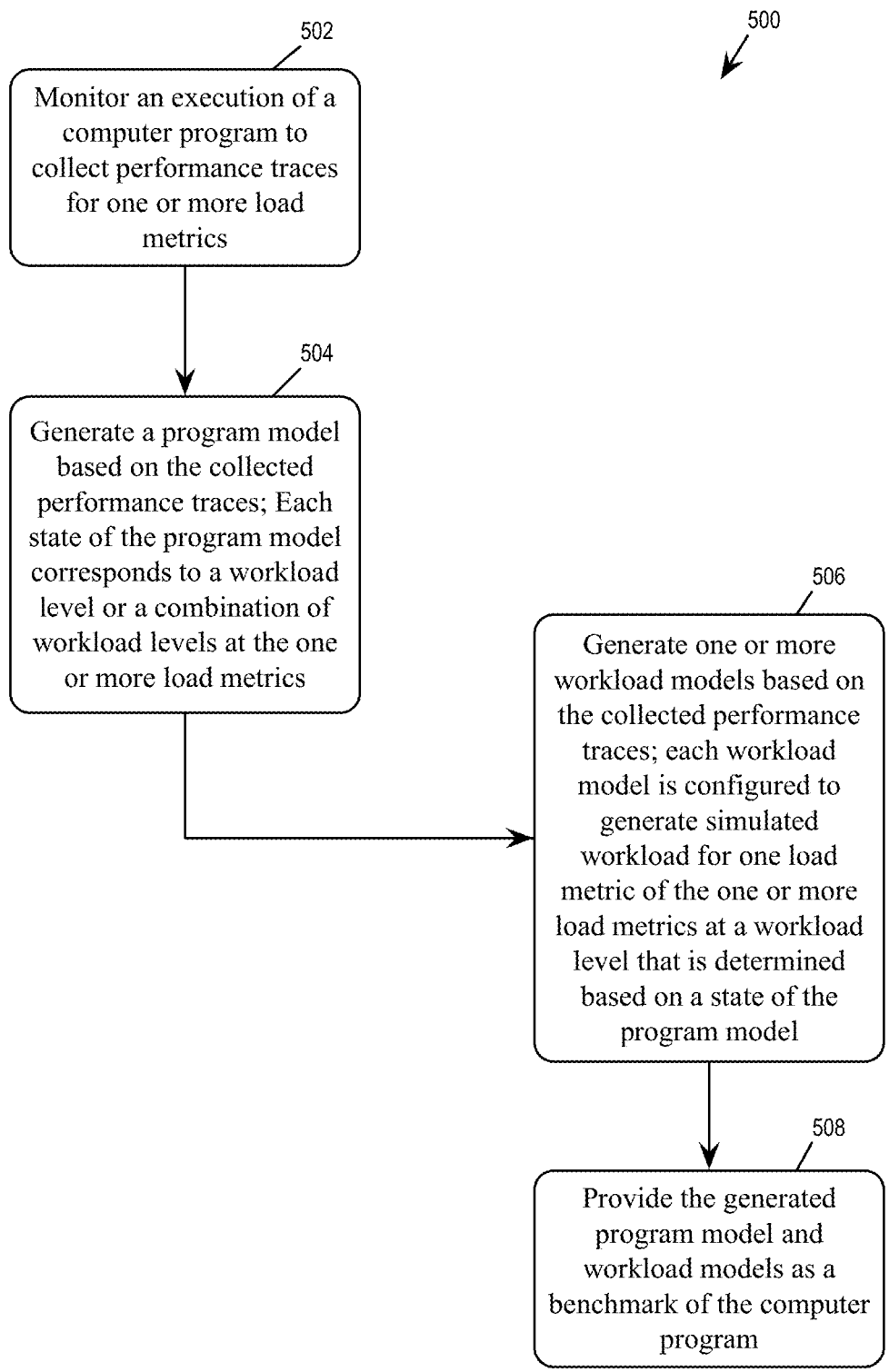
FIG. 5 conceptually illustrates a process performed by a benchmark generating system, consistent with an exemplary embodiment.

FIG. 5 conceptually illustrates a process 500 performed by a benchmark generating system, consistent with an exemplary embodiment. In some embodiments, one or more processing units (e.g., processor) of a computing device implementing the benchmark generating system 100 (e.g., the computing device 108) perform the process 500 by executing instructions stored in a computer readable medium.

The benchmark generating system monitors (at block 502) an execution of a computer program to collect performance traces (resource consumption traces or measurements) for one or more load metrics. The one or more load metrics may be specified by the user of the benchmark generating system.

The benchmark generating system generates (at block 504) a program model based on the collected performance traces. Each state of the program model corresponds to a workload level of one load metric or a combination of workload levels at two or more load metrics. In some embodiments, the program model includes a continuous Markov chain (CTMC) state machine. The system also determines the transitioning probabilities between different states of the program model. In some embodiments, each state of the program model corresponds to a clustered workload level at one load metric or a combination of clustered workload levels at two or more load metrics. Each clustered workload level of a load metric is aggregated from multiple samples of workload levels of the load metric at finer granularity. In some embodiments, each clustered workload level of a load metric is identified based on local minima of a probability distribution of workload levels for the load metric.

The benchmark generating system generates (at block 506) one or more workload models based on the collected performance traces. Each workload model is configured to generate simulated workload for a load metric at a workload level that is determined based on a state of the program model. In some embodiments, the workload models are configured to inject noise into the simulated workload.

The benchmark generating system provides (at block 508) the generated program model and the generated workload models as a benchmark of the computer program.

In some embodiments, the computing device 108 implementing the benchmark generating system 100 includes a user interface to allow the user to modify the generated benchmark. This enables what-if analyses by the user. For example, a user may test how a given verifying system would respond to the target program if it uses 10% more CPU resources, by modifying the parameters of a workload model that is configured to generate simulated CPU traffic (e.g., the workload model 128). Similarly, the user may tune a workload model to have a certain peak workload level in order to test how the verifying system respond to such a peak. As a further example, a user may modify the workload models to determine the difference in cost between sizing for maximum resource usage versus sizing for some steady-state resource usage, thus justifying a decision to size the machine for steady state load and offload the peak workloads to the cloud.

By using performance traces and measurements to identify clusters of workload levels and CTMC states, the benchmark generating system is able to automatically generate a benchmark of a target program. The clustering of workload levels also prevents state explosion, thereby creating a more efficient benchmark.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 2 and 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
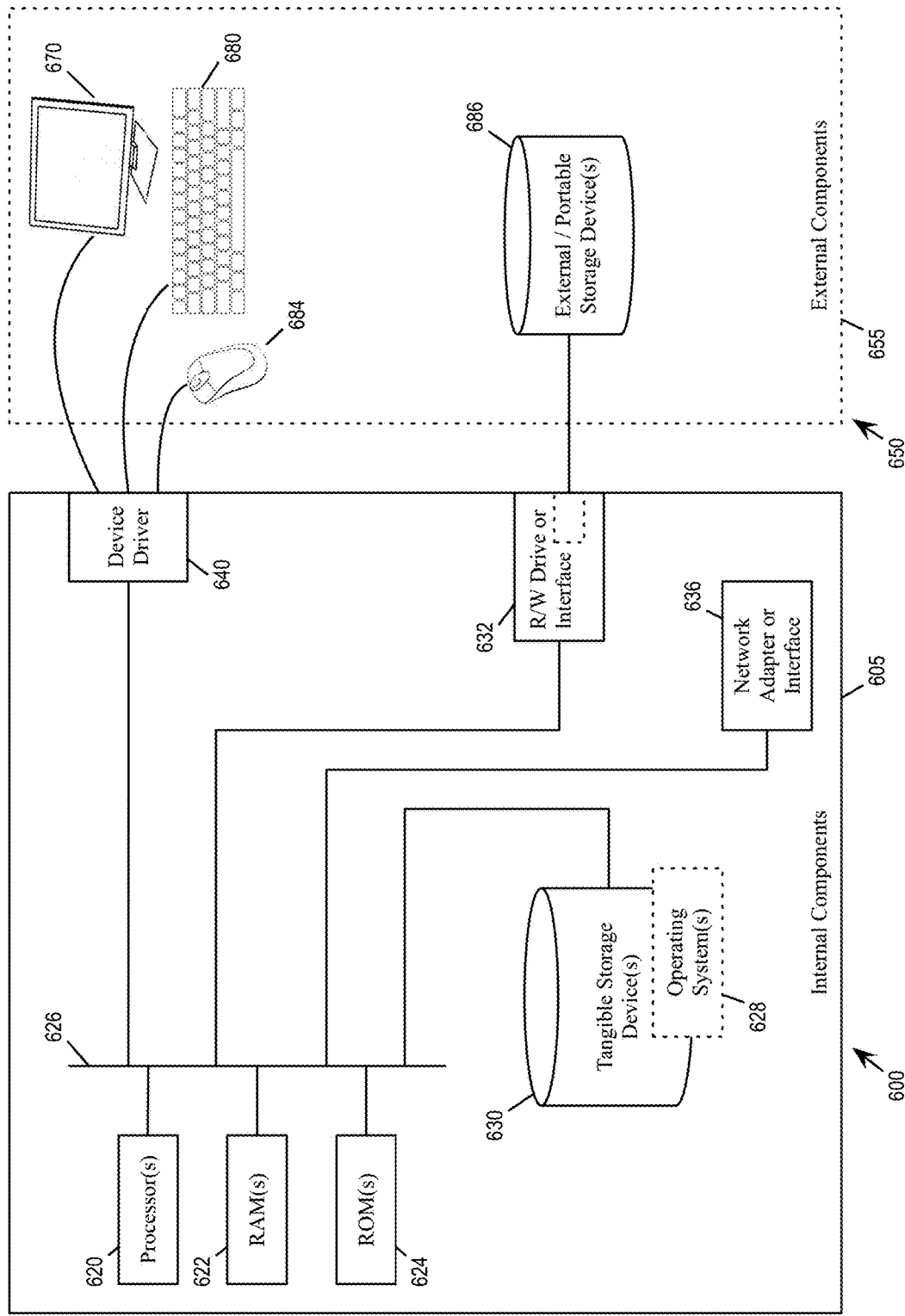
FIG. 6 shows a block diagram of the components of a data processing system in accordance with an illustrative embodiment.

FIG. 6 shows a block diagram of the components of data processing systems 600 and 650 that may be used to implement a system for generating benchmarks (i.e., the benchmark generating system 100) in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the processes 200 and 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 200 and 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

The proposed system can be used to generate benchmarks for steady state operation of both HPC and commercial cloud applications. The system can also be used to determine what part of the load stays on-premise and what can be migrated off-premise in hybrid clouds, optimizing for cost.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 7:
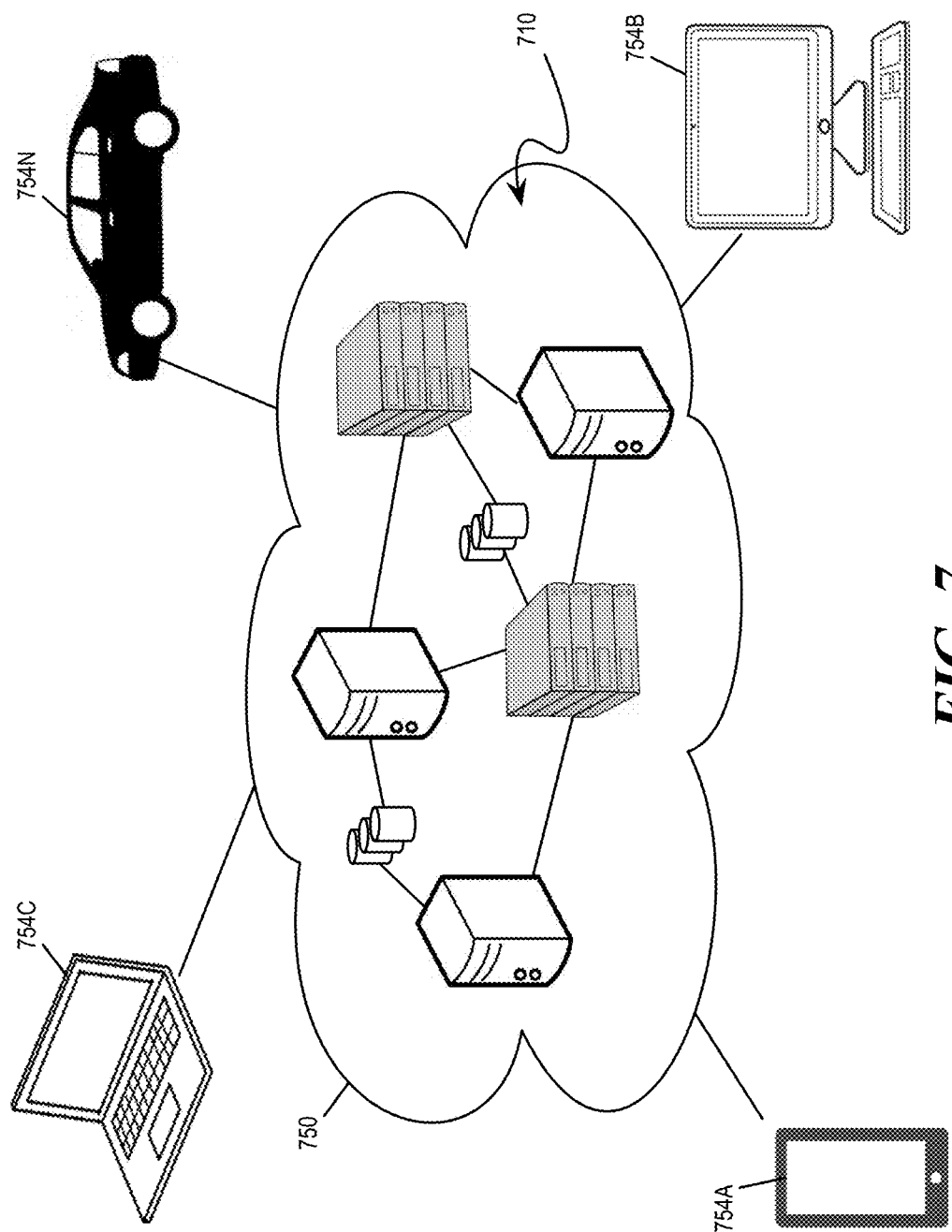
FIG. 7 illustrates an example cloud-computing environment.

Referring now to FIG. 7, an illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
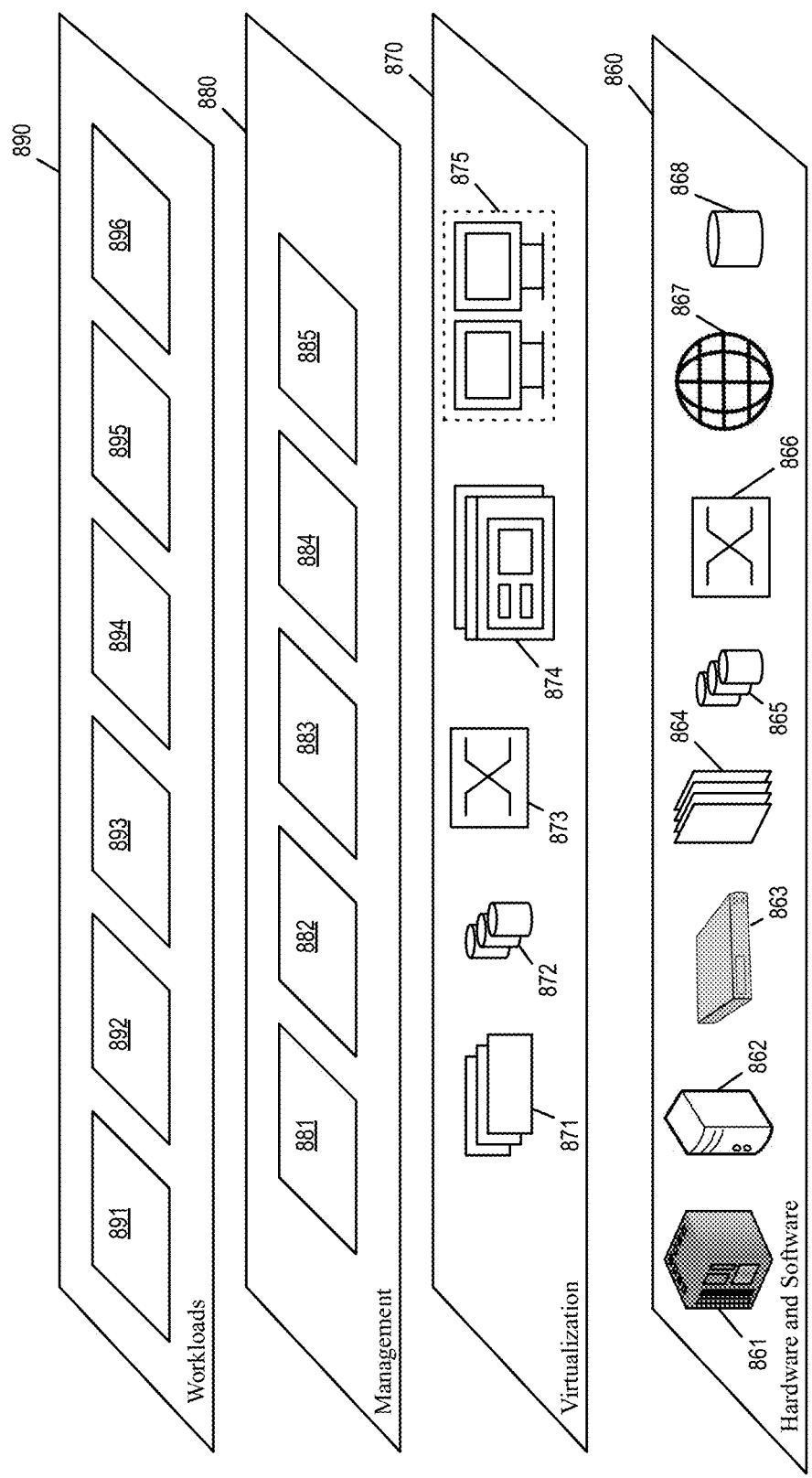
FIG. 8 illustrates a set of functional abstraction layers provided by a cloud-computing environment, consistent with an exemplary embodiment.

Referring now to FIG. 8, a set of functional abstraction layers provided by cloud computing environment 750 (of FIG. 7) is shown. It should be understood that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud-computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and workload 896. In some embodiments, the workload 896 performs some of the operations of the benchmark generating system 100, e.g., identifying clusters of workload levels and deriving a CTMC state machine from performance traces of a program.

The foregoing one or more embodiments implement a benchmark generating system within a computer infrastructure by having one or more computing devices executing a target program, collecting performance traces, clustering workload levels, and creating a CTMC state machine. The computer infrastructure may further be used to execute a generated benchmark that generate simulated workloads based states of the CTMC state machine.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring an execution of an application software to collect performance traces for load metrics;
generating a state machine program model based on the collected performance traces, wherein each state of the program model corresponds to a clustered workload level at one load metric of the load metrics or a combination of clustered workload levels at two or more load metrics of the load metrics, each clustered workload level being aggregated from a plurality of samples of workload levels of the load metrics at finer granularity and being uniquely identified based on local minima of a probability distribution function (PDF) of workload levels for the load metrics, the PDF being fitted for a particular load metric to determine the variations in each clustered workload level to simulate noise;
generating one or more workload models based on the collected performance traces, wherein each workload model is configured to generate simulated workload for one load metric of the load metrics at a workload level that is determined based on a state of the program model, the generating simulated workload comprising injecting the noise into the simulated workload; and
automatically generating a benchmark comprising the generated program model and the generated workload models.

2. The computer-implemented method of claim 1, wherein the program model comprises a probabilistic model state machine.

3. The computer-implemented method of claim 1, wherein generating the program model comprises determining transitioning probabilities between different states of the program model.

4. The computer-implemented method of claim 1, wherein the performance traces for the load metrics comprise statistics for memory consumption, network usage, central processing unit (CPU) usage, graphics processing unit (GPU) usage, or storage usage.

5. A computing device comprising:
a hardware processor; and
a storage device storing a set of instructions, wherein an execution of the set of instructions by the processor configures the computing device to perform acts comprising:
monitoring an execution of an application software to collect performance traces for load metrics;
generating a state machine program model based on the collected performance traces, wherein each state of the program model corresponds to a clustered workload level at one load metric of the load metrics or a combination of clustered workload levels at two or more load metrics of the load metrics, each clustered workload level being aggregated from a plurality of samples of workload levels of the load metrics at finer granularity and being uniquely identified based on local minima of a probability distribution function (PDF) of workload levels for the load metrics, the PDF being fitted for a particular load metric to determine the variations in each clustered workload level to simulate noise;

generating one or more workload models based on the collected performance traces, wherein each workload model is configured to generate simulated workload for one load metric of the load metrics at a workload level that is determined based on a state of the program model, the generating simulated workload comprising injecting the noise into the simulated workload; and automatically generating a benchmark comprising the generated program model and the generated workload models.

6. The computing device of claim 5, wherein the program model comprises a probabilistic model state machine.

7. The computing device of claim 5, wherein generating the program model comprises determining transitioning probabilities between different states of the program model.

8. The computing device of claim 5, wherein the performance traces for the load metrics comprise statistics for memory consumption, network usage, central processing unit (CPU) usage, graphics processing unit (GPU) usage, or storage usage.

9. A computer program product comprising:
one or more non-transitory computer-readable storage devices and program instructions stored on at least one of the one or more non-transitory storage devices, the program instructions executable by a processor, the program instructions comprising:
monitoring an execution of an application software to collect performance traces for load metrics;

generating a state machine program model based on the collected performance traces, wherein each state of the program model corresponds to a clustered workload level at one load metric of the load metrics or a combination of clustered workload levels at two or more load metrics of the load metrics, each clustered workload level being aggregated from a plurality of samples of workload levels of the load metrics at finer granularity and being uniquely identified based on local minima of a probability distribution function (PDF) of workload levels for the load metrics, the PDF being fitted for a particular load metric to determine the variations in each clustered workload level to simulate noise;

generating one or more workload models based on the collected performance traces, wherein each workload model is configured to generate simulated workload for one load metric of the load metrics at a workload level that is determined based on a state of the program model, the generating simulated workload comprising injecting the noise into the simulated workload; and automatically generating a benchmark comprising the generated program model and the generated workload models.

10. The computer program product of claim 9, wherein the program model comprises a probabilistic model state machine.

11. The computer program product of claim 9, wherein generating the program model comprises determining transitioning probabilities between different states of the program model.

12. The computer program product of claim 9, wherein the performance traces for the load metrics comprise statistics for memory consumption, network usage, central processing unit (CPU) usage, graphics processing unit (GPU) usage, or storage usage.

* * * * *